(12) United States Patent
Katagishi et al.

(10) Patent No.: US 6,411,781 B1
(45) Date of Patent: Jun. 25, 2002

(54) LENS BARREL HAVING A CHANGEOVER MEMBER BETWEEN AUTOMATIC FOCUSING AND MANUAL FOCUSING

(75) Inventors: Yuuichi Katagishi, Tokyo; Koushi Yoshibe, Kawasaki, both of (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/572,099

(22) Filed: May 17, 2000

(30) Foreign Application Priority Data

May 18, 1999 (JP) .......................................... 11-136808

(51) Int. Cl.[7] .......................... G03B 13/00; G02B 15/14
(52) U.S. Cl. .......................................... 396/89; 359/702
(58) Field of Search .............................. 396/73, 74, 75, 396/89, 83, 137; 359/694, 698, 702, 823, 824, 825

(56) References Cited

U.S. PATENT DOCUMENTS 4,272,174 A * 6/1981 Terramoto et al. .......... 396/137
5,041,855 A * 8/1991 Takezawa et al. .......... 396/137
5,239,417 A * 8/1993 Eguchi et al. .............. 359/823

* cited by examiner

*Primary Examiner*—Russell Adams
*Assistant Examiner*—Arthur A Smith
(74) *Attorney, Agent, or Firm*—Morgan, Lewis & Bockius LLP

(57) ABSTRACT

Lens barrel has a changeover member for changing the lens focusing operation between automatic focusing and manual focusing. The lens barrel includes an automatic focusing unit for automatically adjusting a focusing operation of the lens, a changeover unit for selectively choosing either the manual focusing unit or the automatic focusing unit, and a locking mechanism for prohibiting the changeover operation of the changeover unit.

5 Claims, 9 Drawing Sheets

LENS BARREL HAVING A CHANGEOVER MEMBER BETWEEN AUTOMATIC FOCUSING AND MANUAL FOCUSING

BACKGROUND OF THE INVENTION

This application is based upon and claims priority of Japanese Patent Application No. 11-136808 filed May 18, 1999, the contents being incorporated herein by reference.

FIELD OF THE INVENTION

The present invention relates to a lens barrel and more specifically to a lens barrel having a changeover member for changing over between automatic focusing and manual focusing.

DESCRIPTION OF RELATED ART

Conventionally, a lens of a single lens reflex camera is known which has a changeover member, such as an AF-MF changeover ring, which changes focusing between automatic focusing and manual focusing.

The above-mentioned single lens reflex camera lens (hereafter called an AF-MF changeover lens) has a manual focusing unit, such as a manual operating portion, which makes the AF-MF changeover lens work as a manual focusing lens. The AF-MF changeover lens also has an autofocus unit, such as an automatic focusing driving unit, which makes the AF-MF changeover lens work as an autofocus lens. The AF-MF changeover lens further includes a clutch mechanism which is located between a lens unit in a lens barrel and the manual operating portion as mentioned above, or between the lens unit in the lens barrel and the automatic focusing driving unit as mentioned above.

This clutch mechanism is driven by operating the above-mentioned changeover member (the AF-MF changeover ring). By operating the AF-MF changeover ring, the clutch selectively connects the lens unit with either of the manual operating portion or the automatic focusing driving unit, according to the selected position of the AF-MF changeover ring. Then, either the manual focusing unit or the autofocus unit selectively becomes operable.

Accordingly, when the changeover member (the AF-MF changeover ring) and the clutch mechanism select the autofocus unit, the autofocus driving unit can drive the lens unit, leaving the manual operating portion free.

Furthermore, when the changeover member and accordingly the clutch mechanism select the manual focusing unit, the manual operating portion can move the lens unit with no load of the autofocus driving unit being applied, because the manual focusing ring being disconnected with the autofocus driving unit, thereby focusing adjustment by the manual operating portion being made smoothly.

In the case where a user frequently changes focusing manners between an AF shooting (automatic focusing shooting) and an MF shooting (manual focusing shooting) by using the changeover member (the AF-MF changeover ring), it is preferable to improve an operability of the changeover member by making an operating force of the changeover member small or an operation of the changeover member simple.

However, in the case where a user exclusively performs AF shooting, it is preferable that the changeover member (the AF-MF changeover ring) is held at the automatic focusing position so that the changeover operation from the automatic focusing position to a manual focusing position is hard to be made. On the contrary, in the case where a user exclusively performs MF shooting, it is preferable that the changeover member (the AF-MF changeover ring) is held at the manual focusing position and the changeover operation from the manual focusing position to the automatic focusing position is hard to be made.

Accordingly, for a user who doesn't frequently change the shooting manners between the AF shooting and the MF shooting, if the changeover force of the changeover member is small, or if the changeover operation of the changeover member is simple, this causes a problem of an inconvenient operability of the changeover member.

Furthermore, there is another problem that the changeover member is apt to move from an original position when a camera is not used (for example, when a camera is being carried in a bag). This problem leads to a need to lock the changeover member not to move from the original position even for a user who frequently changes the shooting manners between the AF shooting and the MF shooting.

Meanwhile, if design is so made that the changeover is hard to be made in consideration of or on behalf of the user who doesn't frequently change the shooting manners between AF shooting and MF shooting, in other words, if the changeover is possible only by using a large operation force or complex operation, this causes another problem that the operability of the changeover member is deteriorated for the user who frequently changes the shooting manners between AF shooting and MF shooting.

SUMMARY OF THE INVENTION

It is an object of the present invention to overcome the above-described problems of the conventional lens barrel.

It is another object of the present invention to provide a lens barrel having a changeover unit for changing over between autofocus shooting and manual shooting, in which the lens barrel is capable of selectively choosing either a manual focusing unit or an automatic focusing unit by a manual operation and in which the operability of the lens barrel is diversified according to the versatility of shooting manners between AF shooting and MF shooting, thereby improving convenience of the lens barrel.

In order to achieve the above-mentioned object, according to one aspect of the present invention, there is provided a lens barrel which comprises a manual focusing unit for manually adjusting the focusing operation of a lens, an automatic focusing unit for automatically adjusting the focusing operation of the lens, and a changeover unit for selectively choosing either the manual focusing unit or the automatic focusing unit, and a locking mechanism for prohibiting the changeover operation of the changeover unit.

The changeover unit may be so composed to singly changeover between the manual focusing unit and the automatic focusing unit and the locking mechanism may be independent from the changeover unit.

Furthermore, in accordance with another aspect of the present invention, the manual focusing unit may include a manual operating member for manually moving a lens unit of the lens barrel; the automatic focusing unit may include an autofocus driving unit for automatically moving the lens unit; the changeover unit may include a clutch mechanism for selectively connecting the lens unit to either the manual operating portion or the autofocus driving unit, and include a changeover member which is rotatably fitted to a fixed barrel of the lens barrel and makes the clutch mechanism connect the lens unit selectively to either the manual operating portion or the autofocus driving unit according to the rotation of the changeover member; and the locking mechanism may prohibit the changeover member from rotating, thereby prohibiting the changeover operation of the changeover unit.

Furthermore, in accordance with another aspect of the present invention, the locking mechanism may include an operating button movably mounted on the changeover member, a locking element which interlocks with the operating button, and at least one locking recess formed on the fixed barrel, whereby when the changeover member is rotated by a predetermined angle while the operating button is being pressed, the locking element engages with the locking recess and prohibits the rotation of the changeover member.

Furthermore, in accordance with another aspect of the present invention, the lens barrel may further include a clicking mechanism for clicking the changeover member at a position where the changeover member chooses the manual focusing unit or the automatic focusing unit.

DETAILED DESCRIPTION OF THE PREFERRED EMBODIMENTS

An embodiment of the present invention will be described below with reference to FIG. 1 through FIG. 12.

Figure 1:
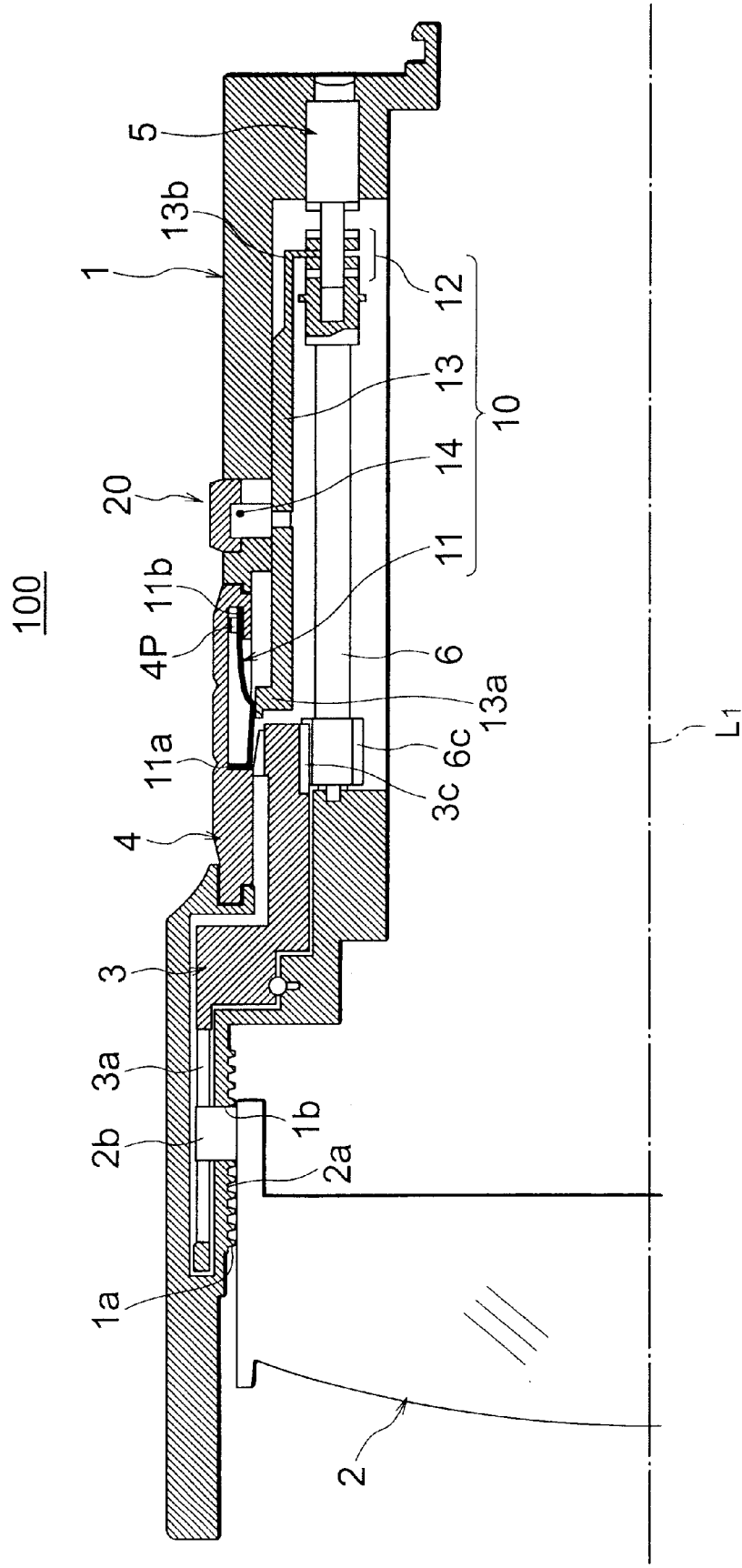
FIG. 1 is a cross-sectional view of a lens barrel when automatic focusing is performed in accordance with an embodiment of the present invention.

FIG. 1 is a cross-sectional view of a lens barrel 100 in accordance with an embodiment of the present invention.

Referring to FIG. 1, the lens barrel 100 includes a fixed barrel 1, a focusing lens 2, a rotational barrel 3, a manual operating barrel (manual operating member) 4, an autofocus driving member 5, a gear shaft 6, a clutch mechanism 10, a changeover member (changeover ring) 20 and a locking mechanism 30 in which the changeover member 20 is provided.

In the lens barrel 100, a manual focusing unit for adjusting the focusing lens 2, includes the manual operating barrel 4. And an autofocus driving unit of an automatic focusing unit, which performs automatic focusing adjustment of the focusing lens 2, includes the autofocus driving member 5 and the gear shaft 6. A changeover unit includes the clutch mechanism 10 and a changeover member (changeover ring) 20 in the present embodiment.

A helicoid 2a formed on a periphery of the focusing lens 2, engages a helicoid 1a formed on the fixed barrel 1. A pin 2b mounted on the periphery of the focusing lens 2 slidably engages a guide slot 1b of the fixed barrel 1.

Figure 2A:
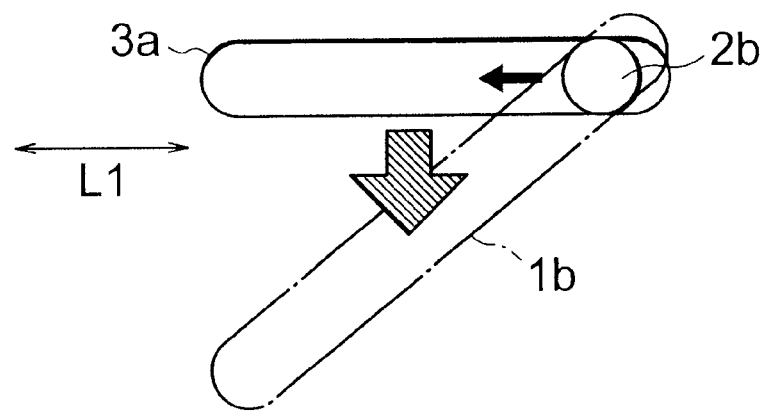
FIGS. 2A to 2C each illustrates a relation between a guide slot and a recess.
Figure 2B:
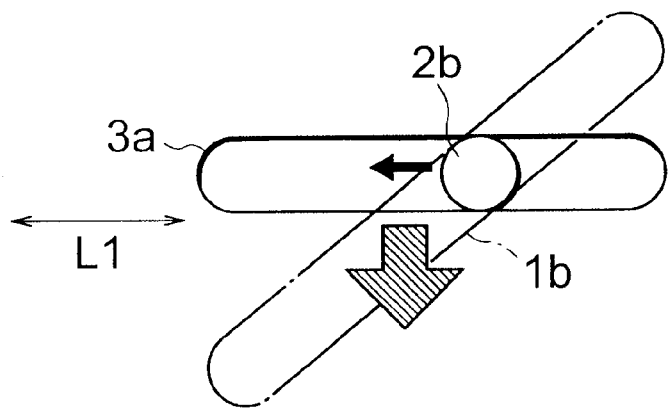
Figure 2C:
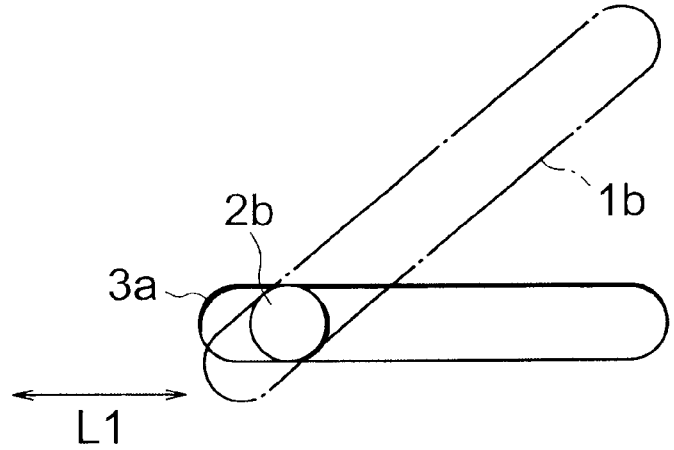

When the rotational barrel 3 rotates relatively to the fixed barrel 1, the guide slot 3a of the rotational barrel 3 moves relatively to the guide slot 1b of the fixed barrel 1. Then, the pin 2b moves in the guide slot 3a in the direction of the optical axis L1 of the lens barrel 100, being led by the guide slot 1b, as shown in FIGS. 2A and 2B. And the pin 2b moves the focusing lens 2 in the direction of the optical axis L1.

The rotational barrel 3 is rotated by the autofocus driving member 5 when the changeover member 20 is located at an automatic focusing position (a first position), as mentioned later. The autofocus driving member 5 is connected to the gear shaft 6, which includes a gear portion 6c engaged with a groove portion 3c of the rotational barrel 3, and the autofocus driving member 5 is rotated by a motor of a camera body (Figures of the motor and the camera body are omitted). When the changeover member 20 is located at a manual focusing position (a second position), the rotational barrel 3 is rotated by the manual operating barrel 4.

Figure 3:
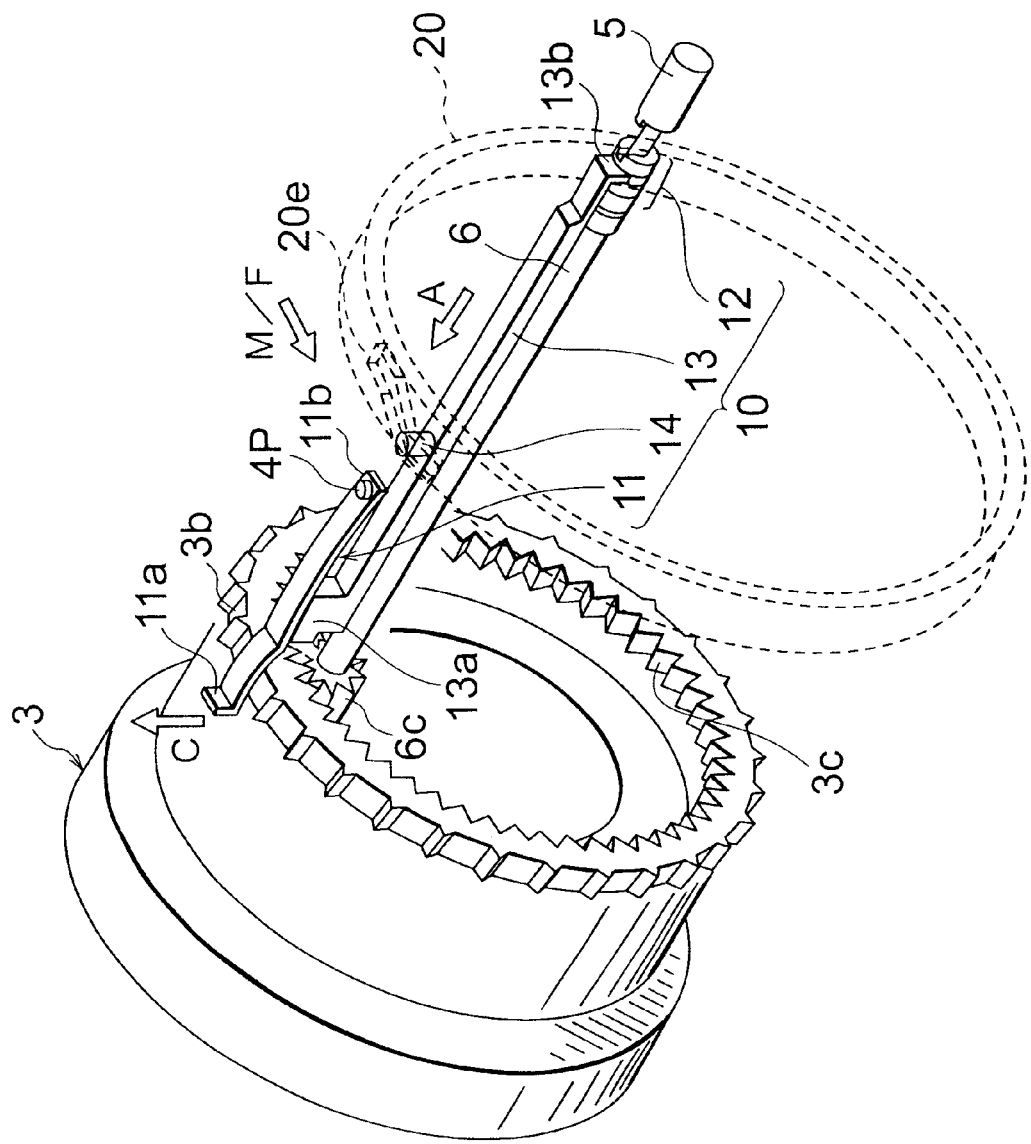
FIG. 3 is a perspective view of a clutch mechanism at the time when automatic focusing is performed in accordance with the embodiment of the present invention.
Figure 4:
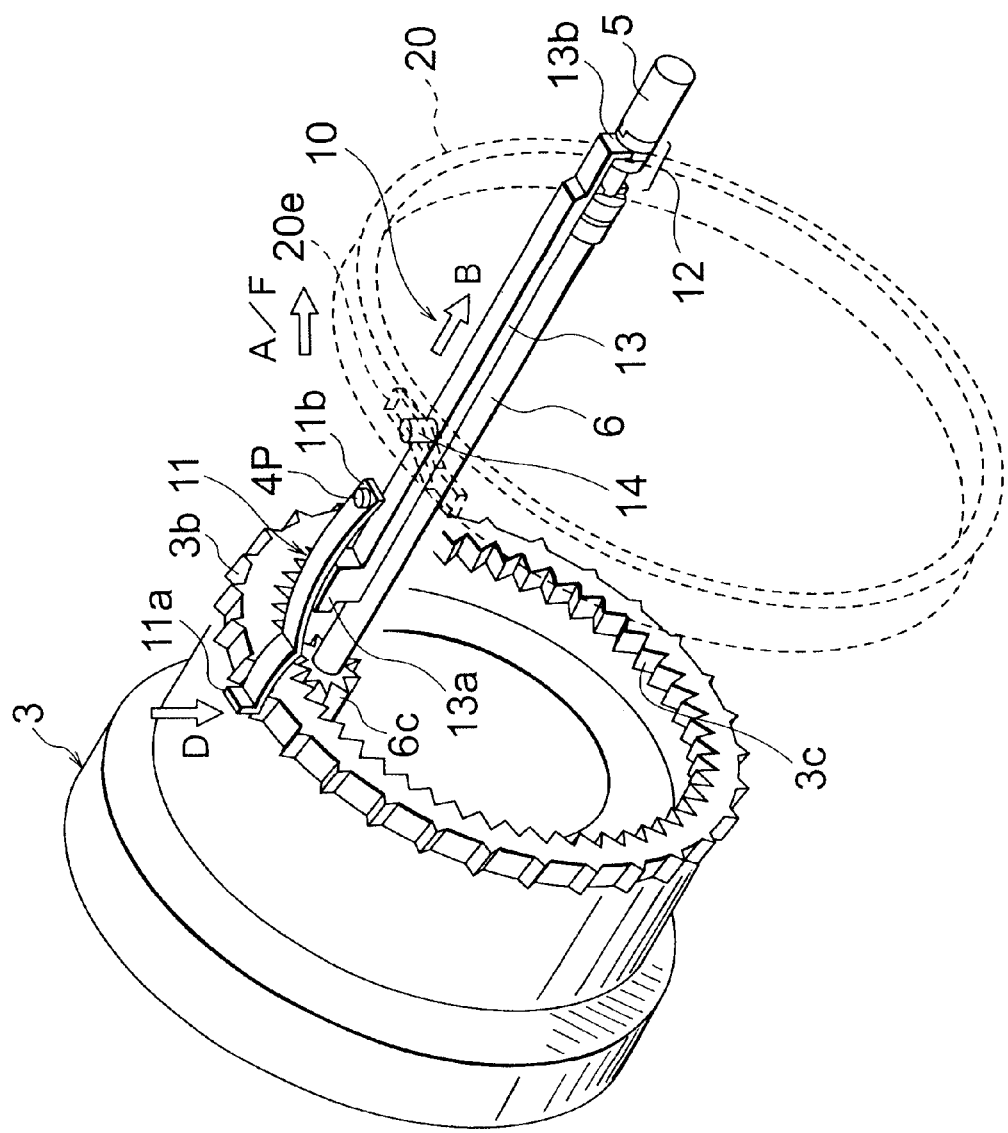
FIG. 4 is a perspective view of the clutch mechanism at the time when manual focusing is performed in accordance with the embodiment of the present invention.

Referring to FIGS. 1, 3, 4, the changeover unit selectively and operatively chooses either the manual focusing unit, which is for manually adjusting the focusing operation of the lens unit, or the automatic focusing unit, which automatically adjusts the focusing operation of the lens unit.

The clutch mechanism 10 of the changeover unit is operated by the rotation of the changeover member 20, and selectively connects the rotational barrel 3 to either the manual operating barrel 4 or the autofocus driving member 5.

The clutch mechanism 10 includes a leaf spring 11, a clutch shaft 12, a clutch lever 13 and a connecting pin 14 formed on the clutch lever 13 nearly in the middle of the clutch lever 13, as shown in FIGS. 1 and 3.

The leaf spring 11 is adapted to connect the manual operating barrel 4 to the rotational barrel 3. One end 11b of the leaf spring 11 is fixed to a fixed portion 4P of the manual operating barrel 4, and the other end 11a of the leaf spring 11 is engageable with a gear portion 3b of the rotational barrel 3 according to up and down movement of the leaf spring 11.

The clutch shaft 12 is adapted to connect the gear shaft 6 to the rotational barrel 3. The clutch shaft 12 is movable in the direction of the optical axis L1 relative to the autofocusing driving member 5, and rotatable together with the autofocus driving member 5 like one member.

A hook portion 13b formed on one end of the clutch lever 13 is engaged with the clutch shaft 12, to move the clutch shaft 12 in the direction of the optical axis L1. The other end 13a (i.e., a pushing portion 13a for the leaf spring 11) of the clutch lever 13 contacts an end 11a of the leaf spring 11 and moves the end 11a up and down.

A connecting pin 14 mounted nearly in the middle of the clutch shaft 12 is moved in the direction of the optical axis L1 by the rotation of the changeover member 20, thereby moving the clutch lever 13 in the direction of the optical axis L1 as shown by arrows A and B in FIGS. 3, 4.

When the changeover member 20 is turned to the position to choose the automatic focusing unit for adjusting automatic focusing (hereafter this position is called automatic focusing position—the first position) as shown in FIGS. 1 and 3, the clutch lever 13 is moved in the direction of the arrow A shown in FIG. 3, causing the clutch shaft 12 engaged with the hook 13b of the clutch lever 13, to connect the autofocus driving member 5 to the gear shaft 6. At this time, since the pushing portion 13a raises an end 11a of the leaf spring 11, the end 11a doesn't engage with a gear portion 3b of the rotational barrel 3.

Accordingly, when the changeover member 20 is at the automatic focusing position (the first position), the rotation of the autofocus driving member 5, which is driven by a driving unit of the camera body, rotates the gear shaft 6, thereby enabling the focusing lens 2 to be automatically adjusted to focus on an object.

Figure 5:
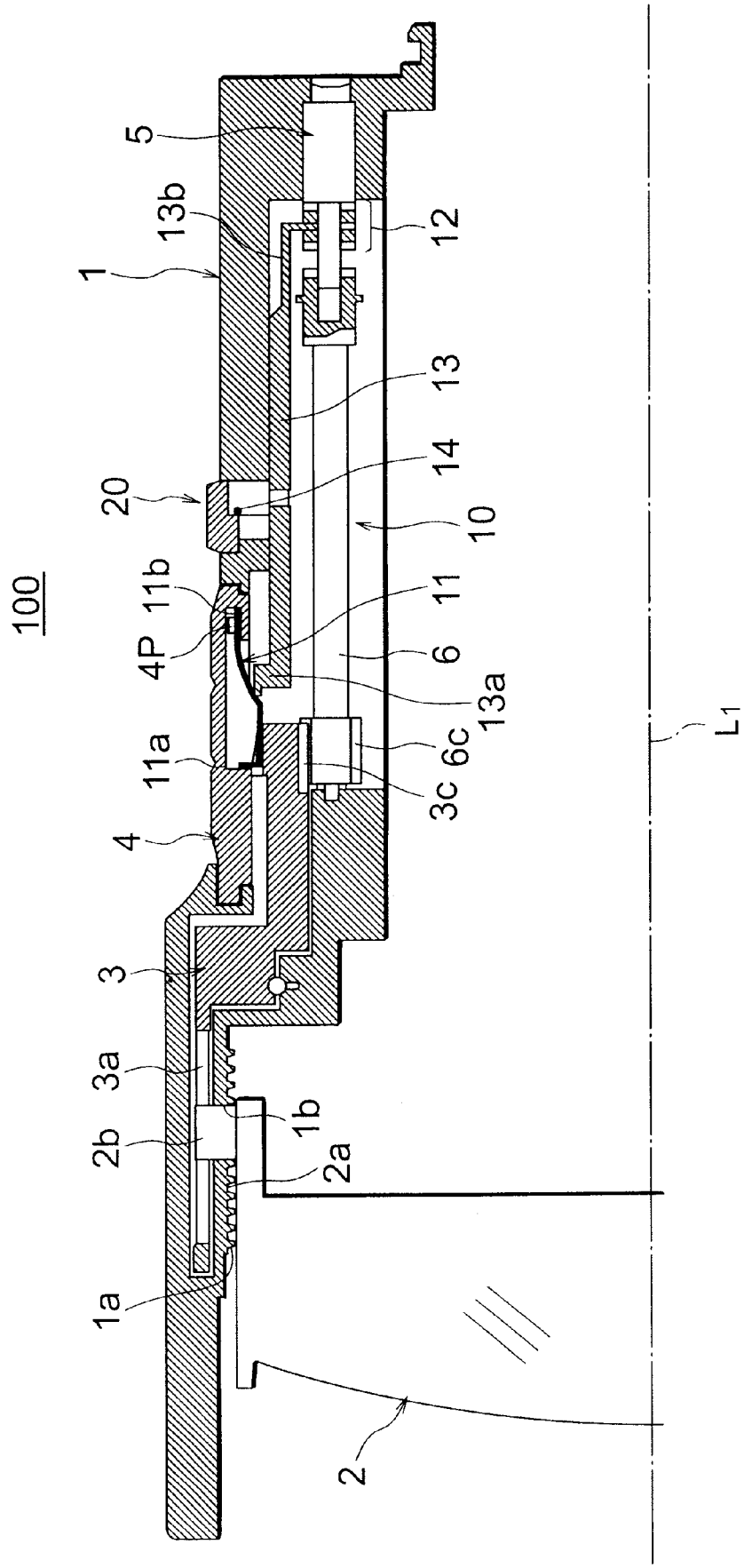
FIG. 5 is a cross-sectional view of the lens barrel in accordance with the embodiment of the present invention at the time when manual focusing is performed.

When the changeover member 20 is turned to another position to choose the manual focusing unit for adjusting manual focusing (hereafter this position is called manual focusing position—the second position) as shown in FIGS. 4 and 5, the clutch lever 13 is moved in the direction of the arrow B shown in FIG. 4, approaching to the camera body. And the clutch shaft 12 engaged with the hook 13b of the clutch lever 13, separates the gear shaft 6 from the autofocus driving member 5. At this time, since the pushing portion 13a doesn't raise the end 11a of the leaf spring 11, the end 11a engages with the gear portion 3b of the rotational barrel 3.

Accordingly, since the engagement of the end 11a with the gear portion 3b connects the manual operating barrel 4 to the rotational barrel 3, the rotation of the manual operating barrel 4 drives the rotational barrel 3, thereby enabling the focusing lens 2 to be manually adjusted to focus on an object.

Referring FIGS. 6 through 10, the changeover member 20 of the changeover unit and a locking mechanism 30 provided therein will be explained. The changeover unit, including the clutch mechanism 10 and the changeover member 20, selectively and operatively chooses either the manual focusing unit or the automatic focusing unit.

The changeover member 20 moves the connecting pin 14 along a guide slot 20e according to the rotational direction of the changeover member 20. The changeover member 20 moves the connecting pin 14 in either of the directions of the arrows A and B shown in FIGS. 3 and 4 according to the rotational direction of the changeover member 20.

The movement of the connecting pin 14 in the direction of the optical axis L1 moves the clutch lever 13 of the clutch mechanism 10.

The changing positions of the changeover member 20 include the automatic focusing position as mentioned above (FIGS. 3 and 7), the manual focusing position (FIGS. 4 and 8), an automatic focusing locking position located beyond the automatic focusing position (a third position as mentioned later referring to FIG. 9) and a manual focusing locking position located beyond the manual focusing position (the second position) (a fourth position as mentioned later referring to FIG. 10).

The locking mechanism 30 for locking the changeover member 20 is specifically constructed and is operated as follows.

Figure 6:
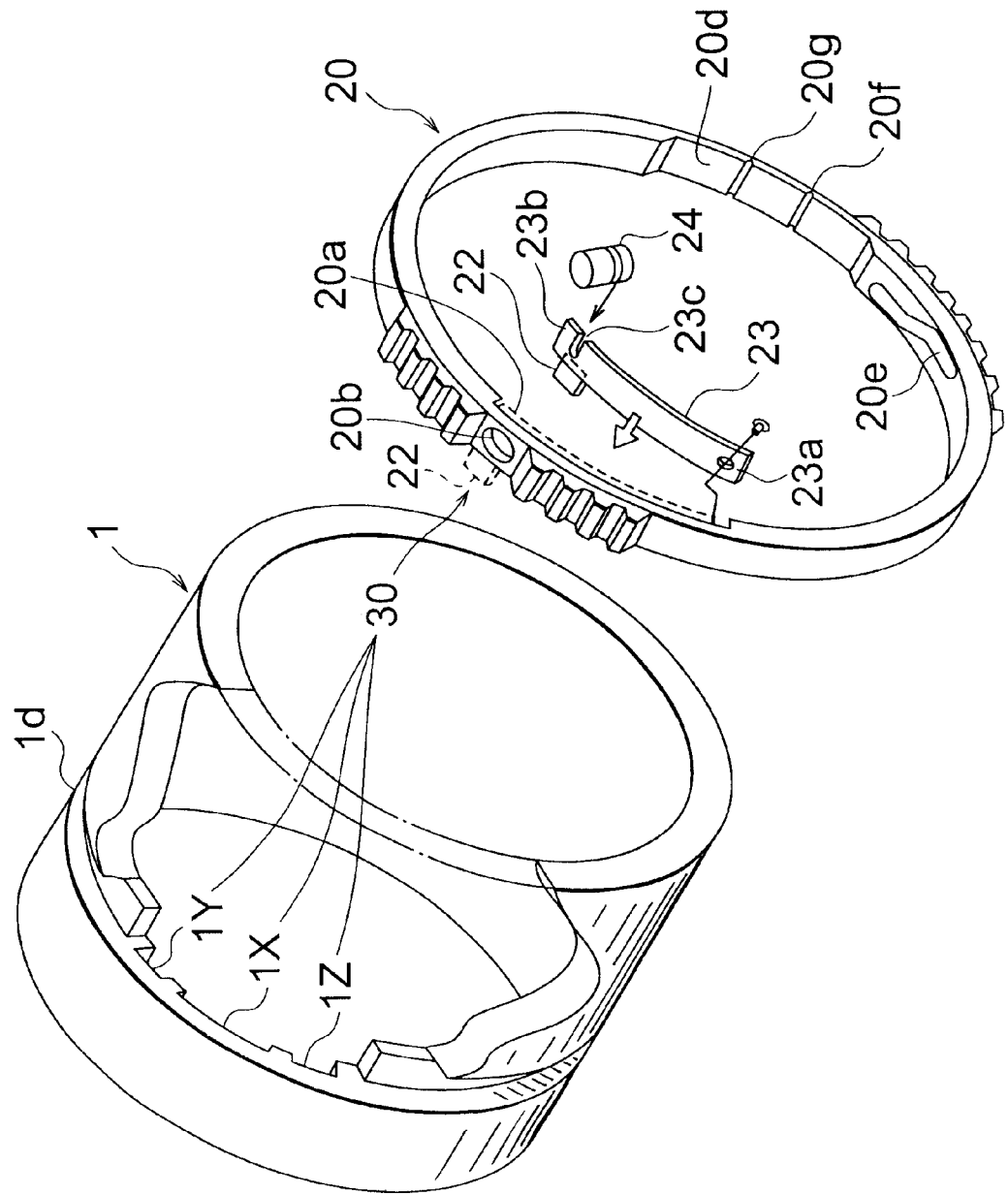
FIG. 6 is a perspective exploded view of a changeover member to be fitted on the lens barrel, and of a locking mechanism provided thereon.

Referring to FIG. 6, the changeover member 20 is rotatably fitted on a recess 1d formed on the fixed barrel 1.

A recess 20a is formed on the inner peripheral surface of the changeover member 20. The recess 20a houses a leaf spring 23 having a locking piece 22 that works as a locking member.

One end 23a of the leaf spring 23 is fixed to the recess 20a with a screw. The other end 23b of the leaf spring 23 is formed with the aforementioned locking piece 22 and with a notch 23c. The notch 23c engages with an operating button 24 that protrudes through the outer surface of the changeover member 20 through a hole 20b of the changeover member 20 (refer to FIGS. 7 through 12).

When the operating button 24 is not pressed, the locking piece 22 is engaged with any of recesses 1X, 1Y and 1Z by spring force of the leaf spring 23, thereby preventing the changeover member 20 from moving from the current position. The width of the recess 1X is large enough in comparison with the width of the locking piece 22 so that the locking piece 22 is movable within a range of the recess 1X. The width of the recess 1X corresponds to a range in which the changeover member 20 is rotated from the autofocusing position (the first position) to the manual focusing position (the second position) (refer to FIG. 7 and FIG. 8). The width of each of the recesses 1Y and 1Z nearly equals the width of the locking piece 22. The position of the recess 1Y corresponds to the automatic focusing locking position (the third position), and the position of the recess 1Z corresponds to the manual focusing locking position (the fourth position). When the operating button 24 is pressed, the locking piece 22 is moved out of the recess, and the changeover member 20 is unlocked, being rotatable.

Figure 7:
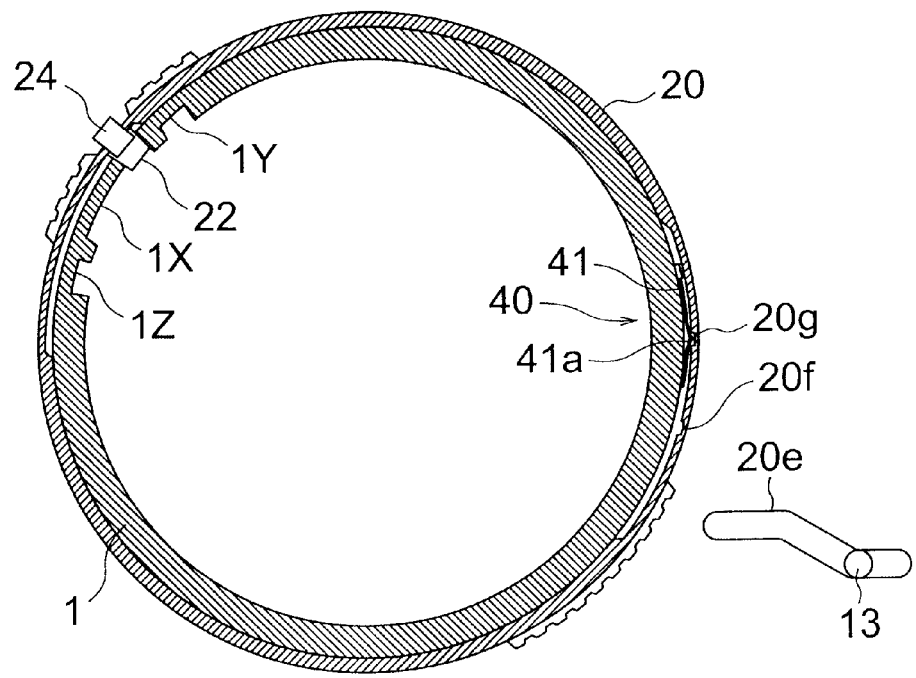
FIG. 7 is a cross-sectional view of the changeover member, at an automatic focusing position, and the locking mechanism provided thereon, and illustrates a position of a connecting pin in a guide slot.
Figure 9:
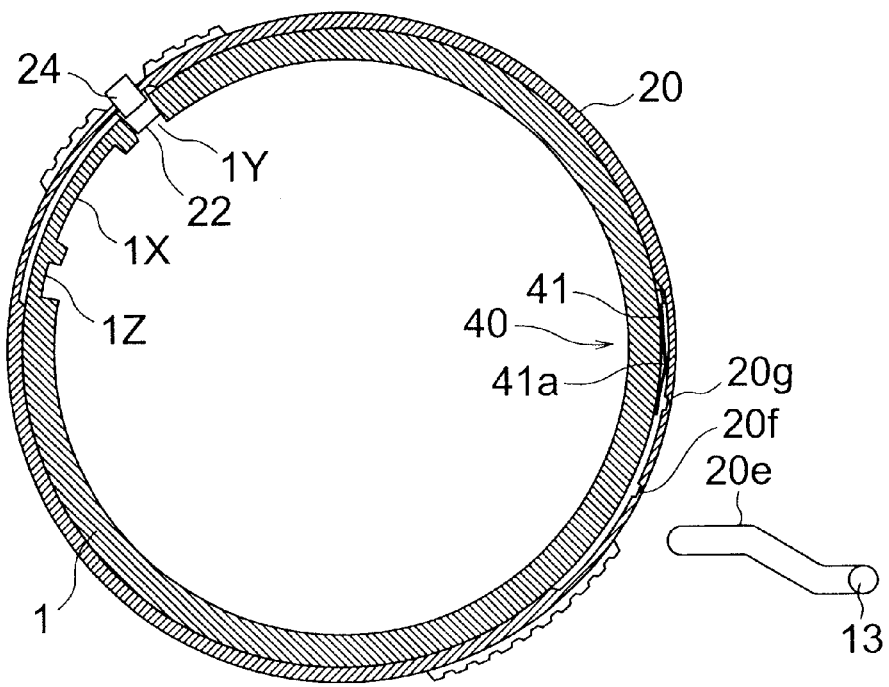
FIG. 9 is a cross-sectional view of the changeover member, in a state where an operating button located at the auto focusing position is depressed and held at the auto focusing locking position, and shows the location of the connecting pin in the guiding slot at that state.
Figure 11:
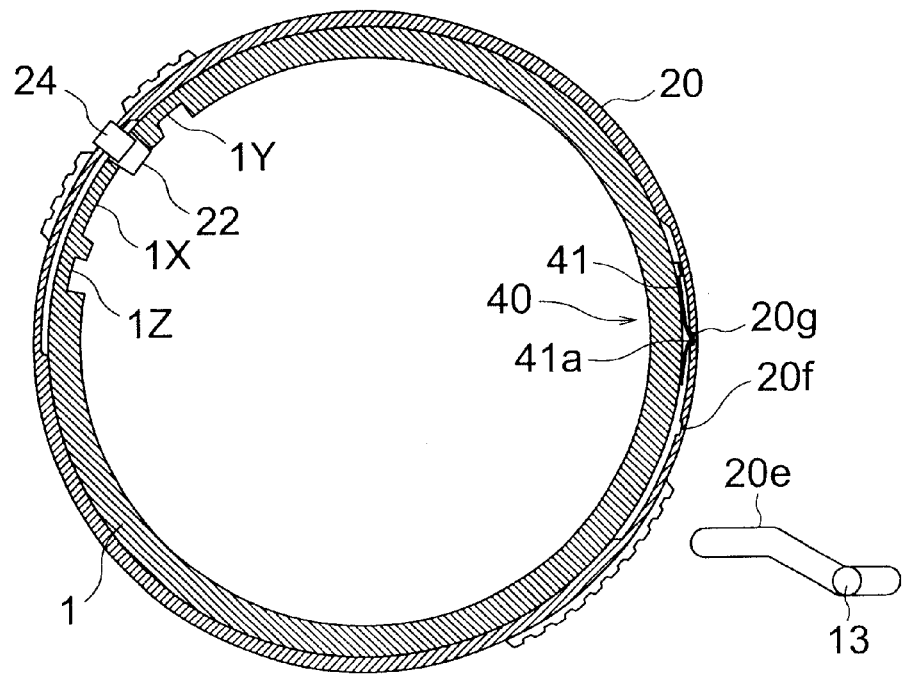
FIG. 11 is a cross-sectional view of the changeover member in a state where the operating button located at the auto focusing position is depressed, and shows the location of the connecting pin in the guiding slot.
Figure 12:
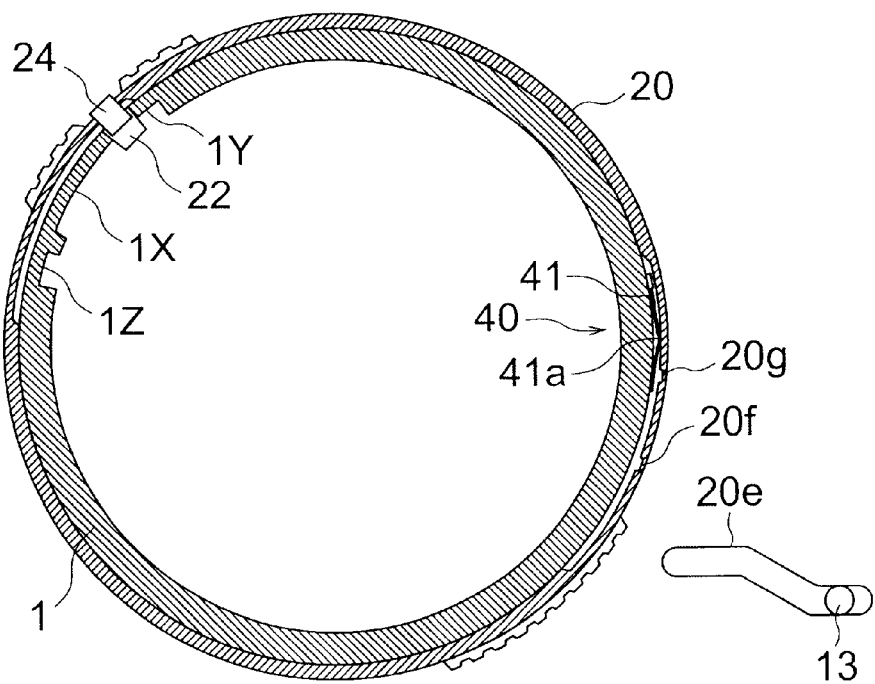
FIG. 12 is a cross-sectional view of the changeover member, in a state where the operating button located at the auto focusing position is depressed and the changeover member is rotated, and shows the connecting pin in the guiding slot at that state.

Specifically, in order to change the changeover member 20 from the automatic focusing position (the first position), as shown in FIG. 7, to the automatic focusing locking position (the third position), as shown in FIG. 9, firstly, the operating button 24 is pressed and held there as shown in FIG. 11. Then, by rotating the changeover member 20, the locking piece 22 passes over the protruded portion between the recess 1X and the recess 1Y, as shown in FIG. 12. Thus, by rotating the changeover member 20 by a predetermined angle from the position where the locking piece 22 engages with the recess 1X to the position where the locking piece 22 is engageable with the recess 1Y, the locking piece 22 engages with the recess 1Y, and the changeover member 20 is locked at the automatic focusing locking position.

Figure 8:
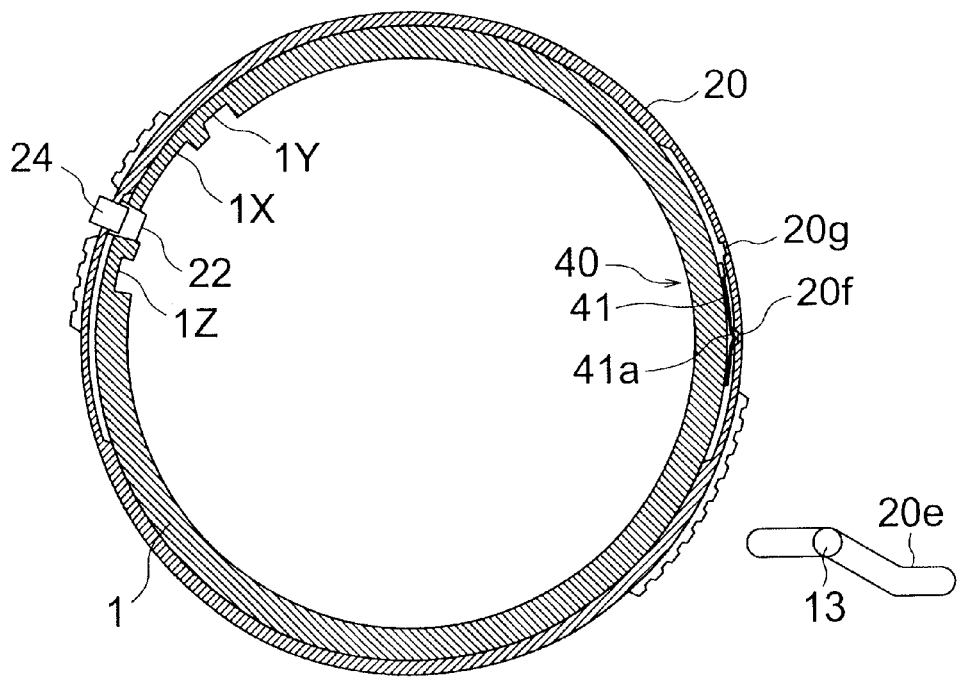
FIG. 8 is a cross-sectional view of the changeover member, at a manual focusing position, and the locking mechanism, and illustrates a position of the connecting pin in the guide slot.
Figure 10:
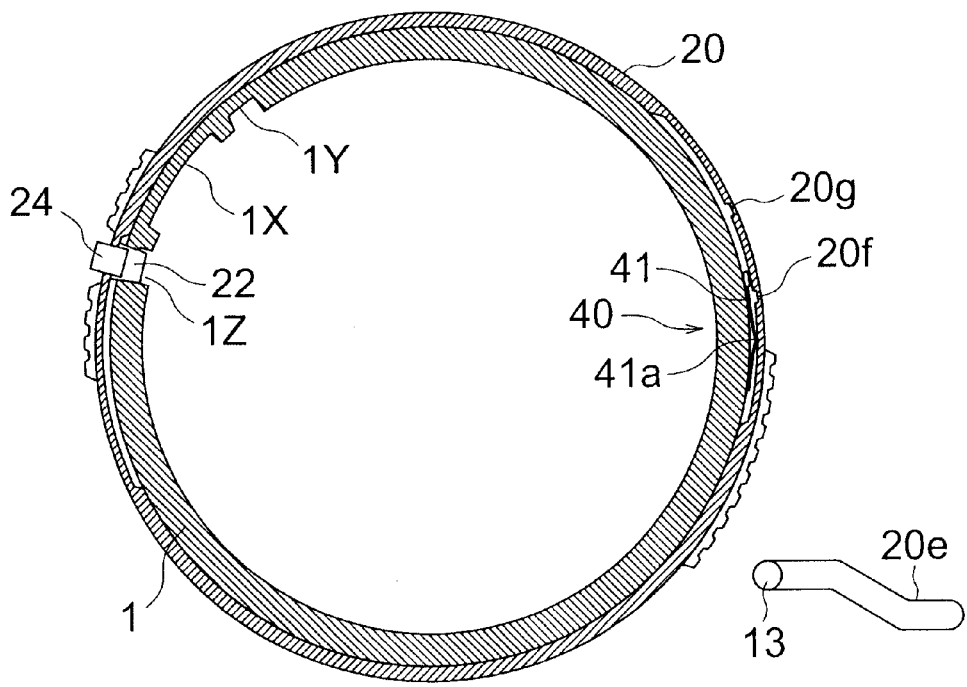
FIG. 10 is a cross-sectional view of the changeover member, at a manual focusing locking position, and the locking mechanism, and illustrates a position of the connecting pin in the guiding slot.

In the case of changing the position of the changeover member 20 from the manual focusing position (the second position), as shown in FIG. 8, to the manual focusing locking position (the fourth position), as shown in FIG. 10, similar operations are performed.

A click mechanism 40 is provided at each of the positions of the automatic focusing position and the manual focusing position so that a user recognizes the two positions.

The click mechanism 40 includes a click spring 41 fixed to the fixed barrel 1 and click grooves 20f and 20g which are formed on the surface of a recess 20d which is inner surface of the changeover member 20.

As described above, in the lens barrel 100 of this embodiment, the changeover member 20 controls the clutch mechanism 10 to selectively connect the rotational barrel 3 to either the manual operation barrel 4 or the autofocus driving member 5. And, without pressing the operation button 24, the changeover member 20 may change the position thereof from the automatic focusing position (the first position) to the manual focusing position (the second position), or vice versa.

On the other hand, in order to change the position from the automatic focusing position (the first position) to the automatic focusing locking position (the third position), or vice versa, the changeover operation must be performed by doing two procedures simultaneously, that is, by rotating the changeover member 20 by a predetermined angle while pressing the operating button 24. Likewise, in order to change the position from the manual focusing position (the second position) to the manual focusing locking position (the fourth position), or vice versa, the changeover operation must be performed by rotating the changeover member 20 by a predetermined angle while pressing the operating button 24.

Thus, the rotation of the changeover member 20 is performed by two manners, that is, by rotating only the changeover member 20, and by rotating the changeover member 20 while pressing the operating button 24.

When only the changeover member 20 is operated between the automatic focusing position (the first position) and the manual focusing position (the second position), the click spring 41 engages with the click grooves 20f and 20g. Since there is not any other operation besides the operation of the click spring 41, a user can rotate the changeover member 20 with ease, that is, with a simple operation and a small force. Therefore, for a user who frequently changes the AF shooting and the MF shooting, it is only necessary to operate the changeover member 20 between the automatic focusing position and the manual focusing position.

When the lens barrel 100 is not used (for example, when carried in the bag), by setting the changeover member 20 at the automatic focusing locking position (the third position) or at the manual focusing locking position (the forth position), the changeover member 20 is never rotated accidentally unless the operating button 24 is pressed.

In the case where a user focuses on an object exclusively by automatic focusing, or exclusively by manual focusing, it is only necessary for the user to retain the changeover member 20 at the automatic focusing locking position (the third position) or the manual focusing locking position (the fourth position).

In accordance with an embodiment of the present invention described herein, the changeover operation that the changeover unit changes over between the manual focusing unit and the automatic focusing unit is singly performed easily or simply. And the changeover member and the locking mechanism lock the automatic focusing unit or the manual focusing unit with a large operating force or with a simple operation. That is, two types of changeover operations are usable. Therefore, the changeover unit can diversify the operability of the lens barrel according to the versatility of shooting manners between AF shooting and MF shooting, and the convenience of the lens barrel is improved.

Furthermore, in accordance with an embodiment of the present invention, the rotation of the changeover member is prohibited by the simple locking mechanism. Therefore, two types of changeover operations are possible, one is to singly change the changeover member with a small force or with a simple operation, and the other is to change the changeover member with a large operation force or with a complex operation by using the changeover member and the locking mechanism, so that versatility and the convenience of operation are achieved.

Furthermore, in accordance with an embodiment of the present invention, by engaging the locking piece with the recess, the rotation of the changeover member is prohibited. Therefore, it is possible to make the locking mechanism simple.

Furthermore, in accordance with an embodiment of the present invention, a user recognizes the changeover operation by feeling the click action which is caused by the click mechanism, when the changeover member is singly changed between the manual focusing position and the automatic focusing position. Therefore, it is possible to distinguish this changeover operation from the changeover operation using a large operation force or complex operations, so it is possible to achieve the convenience of the changeover operation even if the operability of the changeover member becomes versatile.

Furthermore, although the present invention has been described with respect to the above-mentioned embodiment, the present invention is not limited the above-described embodiment. The present invention is applicable to all types of lens barrel that selectively chooses either the manual focusing unit or the automatic focusing unit.

In particular, in the above-described embodiment, The focusing lens 2 manually focuses on an object by using the manual focusing barrel 4, and automatically focuses on the object by using autofocus driving member 5. And the motor that drives the focusing lens 2 is disposed on the camera body of a single lens reflex camera. However, the present invention is also applicable to the lens barrel that has a motor for driving the focusing lens 2.

Furthermore, although the present embodiment is described with respect to the lens barrel for a single lens reflex camera, it is also applicable to all types lens barrels of which cameras are capable of change lenses.

Although a preferred embodiment of the present invention has been shown and described, it will be appreciated by those skilled in the art that changes may be made in the embodiment without departing from the principles and spirit of the invention, the scope of which is defined in the claims and their equivalents.

What is claimed is:

1. A lens barrel having a changeover member for changing over between automatic focusing and manual focusing, comprising:

a manual focusing unit for manually adjusting a focusing operation of a lens;

an automatic focusing unit for automatically adjusting the focusing operation of the lens;

a changeover unit for selectively choosing either the manual focusing unit or the automatic focusing unit; and a locking mechanism for providing a first, second and third locking positions for the changeover unit, wherein the first locking position prohibits the changeover unit from changing over from the manual focusing unit to the automatic focusing unit;

the second locking position prohibits the changeover unit from changing over from the automatic focusing unit to the manual focusing unit; and the third locking position prohibits the changeover unit from changing to the first and second locking positions.

2. A lens barrel according to claim 1, wherein the changeover unit singly chooses either the manual focusing unit or the automatic focusing unit; and the locking mechanism is independently operated from the changeover unit.

3. A lens barrel according to claim 1, wherein the manual focusing unit includes a manual operating member for manually moving a lens unit of the lens barrel; the automatic focusing unit includes an autofocus driving unit for automatically moving the lens unit; the changeover unit includes a clutch mechanism for selectively connecting the lens unit to either the manual operating portion or the autofocus driving unit, and includes a changeover member which is rotatably fitted to a fixed barrel of the lens barrel and makes the clutch mechanism connect the lens unit selectively to either the manual operating portion or the autofocus driving unit according to a rotational direction of the changeover member; wherein the locking mechanism prohibits the changeover unit from choosing each of the manual focusing unit and the automatic focusing unit by prohibiting the changeover member from rotating.

4. A lens barrel according to claim 3, wherein the locking mechanism includes an operating button movably attached to the changeover member, a locking element which interlocks with the operating button, and at least one locking recess which is formed on the fixed barrel and engages with the locking element; and the rotation of the changeover member is prohibited by engaging the locking element with the locking recess when the changeover member is rotated by a predetermined angle while the operating button is being pressed.

5. A lens barrel as in claim 3 or 4, further comprising a clicking mechanism for clicking the changeover member at a position where the changeover member chooses the manual focusing unit or the automatic focusing unit.

* * * * *